United States Patent [19]

Hayami et al.

[11] Patent Number: 5,369,588
[45] Date of Patent: Nov. 29, 1994

[54] NAVIGATION SYSTEM FOR MOTOR VEHICLES

[75] Inventors: Katsuro Hayami; Kazuhiro Yokouchi; Hirofumi Goto; Chisato Yoshida; Yasushi Fujii, all of Sanda, Japan

[73] Assignee: Mitsubishi Denki Kabushiki Kaisha, Tokyo, Japan

[21] Appl. No.: 926,029

[22] Filed: Aug. 7, 1992

[30] Foreign Application Priority Data

Aug. 9, 1991 [JP] Japan ................. 3-200560

[51] Int. Cl.$^5$ ............................. G06F 15/50
[52] U.S. Cl. ....................... 364/449; 364/444; 340/990; 340/995
[58] Field of Search ............. 364/443, 444, 449; 73/178 R; 340/988, 990, 995

[56] References Cited

U.S. PATENT DOCUMENTS

| | | | |
|---|---|---|---|
| 4,774,671 | 9/1988 | Itoh et al. | 364/444 |
| 4,891,760 | 1/1990 | Kashiwazaki et al. | 340/990 |
| 4,903,211 | 2/1990 | Ando | 340/995 |
| 4,937,751 | 6/1990 | Nimura et al. | 340/995 |
| 4,992,947 | 2/1991 | Nimura et al. | 340/995 |
| 5,043,902 | 8/1991 | Yokoyama et al. | 364/444 |
| 5,067,082 | 11/1991 | Nimura et al. | 340/988 |
| 5,103,400 | 4/1992 | Yamada et al. | 364/444 |
| 5,115,399 | 5/1992 | Nimura et al. | 364/444 |
| 5,159,556 | 10/1992 | Schorter | 340/990 |
| 5,184,303 | 2/1993 | Link | 364/449 |

FOREIGN PATENT DOCUMENTS 1119898 5/1989 Japan.

OTHER PUBLICATIONS

DE-ELO Jul. 1984 pp. 20 to 25.

Primary Examiner—Gary Chin

[57] ABSTRACT

A navigation system for a motor vehicle serves to guide the motor vehicle along an optimum route which includes bypass roads and side destinations desired by a driver but no road of high traffic congestion. When the motor vehicle deviates from the guidance route, an optimum route is again determined, starting from the current position of the motor vehicle. The navigation system includes a manipulating unit 1A for setting the desired bypass roads, side destinations and the final destination, a system controller 11 for setting the destination and the side destinations in terms of the coordinates on a map which are stored in a RAM unit together with information concerning the bypass roads and congested roads, a route extracting unit 6A for extracting an optimum route from a plurality of routes searched by a route search unit 5A on the basis of data read out from the RAM unit 14 and a route guidance controller for determining a distance deviation between the optimum route and the current position of the motor vehicle determined by a current position determining unit 7A. When the distance deviation exceeds a predetermined value, the system controller 11 commands the route search unit 5A and the optimum route extracting unit 6A to start again a new optimum route determining operation.

3 Claims, 9 Drawing Sheets

NAVIGATION SYSTEM FOR MOTOR VEHICLES

BACKGROUND OF THE INVENTION

The present invention relates generally to a navigation system for an automobile or any motor vehicle. More particularly the present invention is concerned with a navigation system adapted to be installed on a motor vehicle for detecting a current position thereof to display it on a road map produced on a display screen together with a destination of the motor vehicle as well as the routes which lead to that destination.

In general, the navigation system for the motor vehicle is designed to display the current position of the motor vehicle, or car, on a guidance road map generated on a display unit for aiding a driver in driving his or her car in unfamiliar districts and/or in the nighttime.

One typical example of the navigation systems for the motor vehicle known heretofore is disclosed in Japanese Patent Laid-Open No. H1-119898 (JP-A-H1-119898). This known navigation system is shown in a block diagram in FIG. 9. Referring to the figure, the known navigation system includes an information/command input unit 1 (hereinafter also referred to as a manipulating unit) for inputting information concerning a range within which a motor vehicle equipped with the navigation system is planned to travel as well as other information and commands. Operatively connected to an output of the manipulating unit 1 is a search range limiting unit 2 which serves for arithmetically determining a linear distance between the current location or position of the motor vehicle and the destination as inputted, to thereby limit or constrict the range within which routes to be followed by the motor car are searched. A map memory 3 for storing information concerning a road network and road segments which constitute the road network is provided in association with a time memory 4 which stores information concerning the times required for driving the motor vehicle along the road segments stored in the map memory 3, the required times being classified according to months, days of the week and time zones. Connected to the output ports of the map memory 3 and the time memory 4 is a route search unit 5 which serves to search all possible combinations of the road segments (hereinafter referred to as the route sets) which can be selected for the motor vehicle to reach the destination from the current position on the basis of the road network information stored in the map memory 3 and the times required for driving the motor vehicle along the routes as selected on the basis of the time information stored in the time memory 4. The output information from the route search unit 5 is supplied to a route extracting unit 6 for selectively extracting the route set which requires the shortest time for the motor vehicle to reach the destination on the basis of the required times involved in driving the motor vehicle along the route sets searched by the route search unit 5. The route set as extracted will hereinafter be referred to as the temporally shortest route. Further, a current vehicle position detecting unit 7 is provided for arithmetically determining the azimuth direction and the distance covered by the motor vehicle to thereby estimate the current position of the motor vehicle. Connected to the outputs of the route extracting unit 6 and the current vehicle position detecting unit 7 is an emphasis signal generator 8 for generating an emphasis signal for displaying the temporally shortest route extracted through the route extracting unit 6 and the current vehicle position with emphasis on the road network map. The output of the emphasis signal generating unit 8 is supplied to a guidance unit 9 for guiding the motor vehicle with the aid of the emphasis signal supplied from the emphasis signal generating unit 8. The required times taken actually for driving the motor vehicle along the road segments as extracted are stored in the time memory 4 by the guidance unit 9. Finally, reference numeral 10 denotes a display unit which is supplied with the aforementioned emphasis signal for displaying the temporally shortest route together with the current vehicle position with emphasis.

Now, referring to a flow chart shown in FIG. 10, description will be made of the temporally shortest route generating operation and the vehicle guidance operation of the known navigation system having the structure described above.

In a step S1, decision is made by the search range limiting unit 2 as to whether or not initialization input information such as that of the destination is loaded through the manipulating unit 1. If the initialization information is loaded (i.e., when the answer of the step S1 is "YES"), the processing proceeds to a step S2, where the route search unit 5 reads out the road segment information from the map memory 3 and then fetches from the time memory 4 the data of required times involved in driving the motor vehicle along the road segments which are read out from the map memory 3 in a step S3, to thereby search the route sets which can lead the motor vehicle to the destination by combining together the road segments in a step S4. Subsequently, in a step S5, the route extracting unit 6 arithmetically determines the times required for driving the motor vehicle along the individual road segments sequentially for each of the route sets as searched. Further, in a step S6, the temporally shortest route (i.e., the route allowing the motor vehicle to reach the destination within the shortest time) is selected. The temporally shortest route thus determined is stored in the time memory 4 in a step S7 on one hand and displayed on the display unit 10 in a step S8 on the other hand. In a step S9, decision is made as to whether or not the motor vehicle has reached the destination. If not (i.e., if the answer of the decision step S9 is negative or "NO"), the processing of the step S9 is repeated, while otherwise the processing proceeds to a step S10 in which the times actually taken for driving the motor vehicle along the individual road segments are stored in the time memory 4. Finally, in a step S11, the temporally shortest route information previously stored in the memory 4 is canceled, whereupon a return is made to the step S1.

In contrast, if there is no input of the initialization information (i.e., the answer in step S1 is "NO"), the processing proceeds to a step S12, where a road network for the planned driving or in which the motor vehicle is currently running is displayed on the display unit 10. In a step S13, the required times actually taken for driving the motor vehicle along the individual road segments are stored in the time memory 4, whereupon the step S1 is resumed.

As will be understood from the above description, in the known navigation system, the driver first designates the destination through the manipulating unit 1. In response, the search range limiting unit 2 properly limits or narrows the route search range on the basis of a straight line connecting between the current position of the motor vehicle and the destination. Subsequently, the route search unit 5 searches all the possible routes leading to the destination within the limited range on the basis of the road network information stored in the map memory 3, while the route extracting unit 6 calculates the times required to reach the destination for all the routes as searched on the basis of the required time information stored in the time memory 4 to compare the required times for all the searched routes with one another to thereby select the temporally shortest route, whereon the emphasis signal generating unit 8 generates an emphasis signal for displaying the temporally shortest route as well as the current vehicle position. The guidance unit 9 responds to a guidance start signal to display on the display unit 10 the temporally shortest time route together with the current vehicle position of the motor vehicle with emphasis. In this manner, visible information is made available for aiding the driver in driving his or her motor vehicle along the temporally shortest route.

The conventional navigation system installed on the motor vehicles such as described above suffers from numerous problems mentioned below. First, with the navigation system known heretofore, there often arise such situations in which a roundabout or bypass road desired by the driver is not selected as a part of the temporally shortest route. A road segment of a high traffic snarl or a high traffic congestion frequency can possibly be selected. For example, the frequency of traffic congestion is defined as the number of occurrences of congestion per day. Further, when the current position of the motor vehicle is deviated from the guidance route, troublesome operation is required for determining again the guidance route. Besides, the guidance route determined in the past can no more represent the temporally shortest route when a predetermined time has lapsed during parking on the way of driving the motor vehicle along the guidance route. Moreover, the arithmetic determination of the temporally shortest route can not be performed before the start of driving even when the starting time is set beforehand, as a result of which the start of the motor vehicle has to be correspondingly delayed until the arithmetic operation activated in response to the operation of a route guidance start key has been completed. Furthermore, in case where there are a plurality of side destinations (i.e. places at which the motor vehicle is to drop in) on the way to the final destination, the sequence of the side destinations has to be decided by the driver himself or herself since the navigation system can set only one destination at a time.

SUMMARY OF THE INVENTION

In view of the state of the art described above, it is an object of the present invention to provide a navigation system for a motor vehicle which are substantially immune to the problems of the above-mentioned conventional navigation systems and which is capable of guiding a motor vehicle along an optimum route which includes as many possible bypass roads as desired by a driver.

Another object of the present invention is to provide a navigation system for a motor vehicle which is capable of guiding the motor vehicle along an optimum route which includes virtually no road segments with frequent traffic congestions.

Still another object of the present invention is to provide a navigation system for a motor vehicle which can warn the driver when the current position or location of the motor vehicle is deviated from a guidance route, and which can guide the motor vehicle again along an optimum route established on the basis of the current position of the vehicle at the time the warning is generated.

Yet another object of the present invention is to provide a navigation system for a motor vehicle which is capable of guiding the motor vehicle along an updated optimum route even after a long parking on the way of driving along the initially set guidance route.

A further object of the present invention is to provide a navigation system for a motor vehicle which can determine an optimum route beforehand in response to setting of a start time by the driver so that the driver can immediately start the motor vehicle without waiting for determination of the route.

It is a still further object of the present invention to provide a navigation system for a motor vehicle which can guide the motor vehicle along an optimum route effectively and efficiently even when there exist a plurality of side destinations on the way to a final destination.

In view of the above and other objects which will become more apparent as description proceeds, there is provided, according to a first aspect of the present invention, a navigation system for a motor vehicle which comprises manipulating means for designating at least a destination and a bypass road desired by a driver, first storage means for storing information concerning a road network and road segments which constitute the road network, current position detecting means for detecting a current position of the motor vehicle, route search means for searching routes which allow the motor vehicle to reach the destination from the current position of the motor vehicle on the basis of the output information available from the first storage means, second storage means for storing information concerning the bypass roads, and route extracting means for extracting an optimum route leading to the destination and including as many bypass roads as possible on the basis of the information available from the route search means and the second storage means.

With the structure of the navigation system described above, it is possible to guide the motor vehicle along an optimum route which includes as many possible bypass road as desired by the driver.

Further, according to a second aspect of the present invention, there is provided a navigation system for a motor vehicle which comprises manipulating means for designating at least a destination, first storage means for storing information concerning a road network and road segments which constitute the road network, current position detecting means for detecting a current position of the motor vehicle, route search means for searching routes which allow the motor vehicle to reach the destination from the current position of the motor vehicle on the basis of the output information from the first storage means, traffic information receiving means for receiving traffic information, a third storage means for storing information concerning congested roads and a frequency of traffic congestion on the basis of output of the traffic information receiving means, and a route extracting means for extracting an optimum route which can lead the motor vehicle to the destination and which is of a low traffic congestion frequency on the basis of the information available from the outputs of tile route search means and the third storage means.

The navigation system of the structure described above makes it possible to guide the motor vehicle along an optimum route from which roads of a high congestion frequency are excluded.

According to a third aspect of the present invention, there is provided a navigation system for a motor vehicle, which comprises manipulating means for designating at least a destination, first storage means for storing information concerning a road network and road segments which constitute the road network, current position detecting means for detecting a current position of the motor vehicle, route search means for searching a plurality of routes which allow the motor vehicle to reach the destination from the current position of the motor vehicle on the basis of the information available from the first storage means, route extracting means for extracting an optimum route leading to the destination from the plurality of the routes mentioned above, route guidance monitoring means for arithmetically determining a deviation distance from the optimum route to the current position of the motor vehicle, and optimum route determination start commanding means for commanding the route search means and the route extracting means to start the optimum route determination when the output value of the route guidance monitoring means is greater than a predetermined value while generating at the same time information for alerting a driver to the fact that the output value of the route guidance monitoring means is greater than the predetermined value.

In the navigation system described above, when the current position of the motor vehicle is deviated from the guidance route, it is possible to alert the driver to this fact and guide the motor vehicle along an optimum route updated on the basis of the current vehicle position.

According to a fourth aspect of the present invention, there is provided a navigation system for a motor vehicle which comprises manipulating means for designating at least a destination, first storage means for storing information concerning a road network and road segments which constitute the road network, current position detecting means for detecting a current position of the motor vehicle, route search means for searching a plurality of routes which allow the motor vehicle to reach the destination from the current position thereof on the basis of the information available from the first storage means, route extracting means for extracting an optimum route leading to the destination from the plurality of searched routes, time lapse decision means for deciding whether or not a predetermined time has elapsed from a time point when the optimum route was extracted before a system power supply is turned off, and optimum route determination start commanding means for commanding the route extracting means to start the arithmetic determination of the optimum route when it is decided by the time lapse decision means that the predetermined time has elapsed.

With the structure of the navigation system described above, an optimum route can be newly determined for guidance of the motor vehicle upon restarting thereof after parking for a long time on the way to the destination.

According to a fifth aspect of the present invention, there is provided a navigation system for a motor vehicle which comprises manipulating means for designating at least a destination and a starting time at which the motor vehicle is to be started from a current position thereof, first storage means for storing information concerning a road network and road segments which constitute the road network, current position detecting means for detecting the current position of the motor vehicle, route search means for searching a plurality of routes which allow the motor vehicle to reach the destination from the current position thereof on the basis of the information available from the first storage means, route extracting means for extracting an optimum route from the plurality of the searched routes, system power supply control means for holding a system power supply in a conducting state even after a battery power supply of the motor vehicle is turned off, and optimum route determination start commanding means for commanding the route extracting means to start the arithmetic determination of an optimal route at the starting time of the motor vehicle and commanding the system power supply control means to turn the system power supply off after the optimal route has been extracted by the route extracting means.

With the structure of the navigation system described above, it is possible to guide the motor vehicle along an optimum route immediately after the vehicle has started by previously setting the starting time.

According to a sixth aspect of the invention, there is provided a navigation system for a motor vehicle which comprises manipulating means for setting at least a destination and a plurality of side destinations to be dropped in on the way to the destination, first storage means for storing information concerning a road network and road segments which constitute the road network, current position detecting means for detecting a current position of the motor vehicle, route search means for searching routes which allow the motor vehicle to reach the destination from the current position thereof on the basis of the information available from the first storage means, and route extracting means for extracting from the routes searched by the route search means an optimal route which allows the motor vehicle to reach the destination from the current position of the motor vehicle by way of the plurality of side destinations.

With the structure of the navigation system described above, it is possible to generate an optimum route for guiding the motor vehicle which can include side destinations which the driver desires to drop in.

The above and other objects, features and advantages of the present invention will be understood by reading the following description of preferred embodiments taken in conjunction with the accompanying drawings.

DESCRIPTION OF THE PREFERRED EMBODIMENTS

Now, the present invention will be described in detail in conjunction with a preferred or exemplary embodiment thereof by reference to the drawings.

Figure 1:
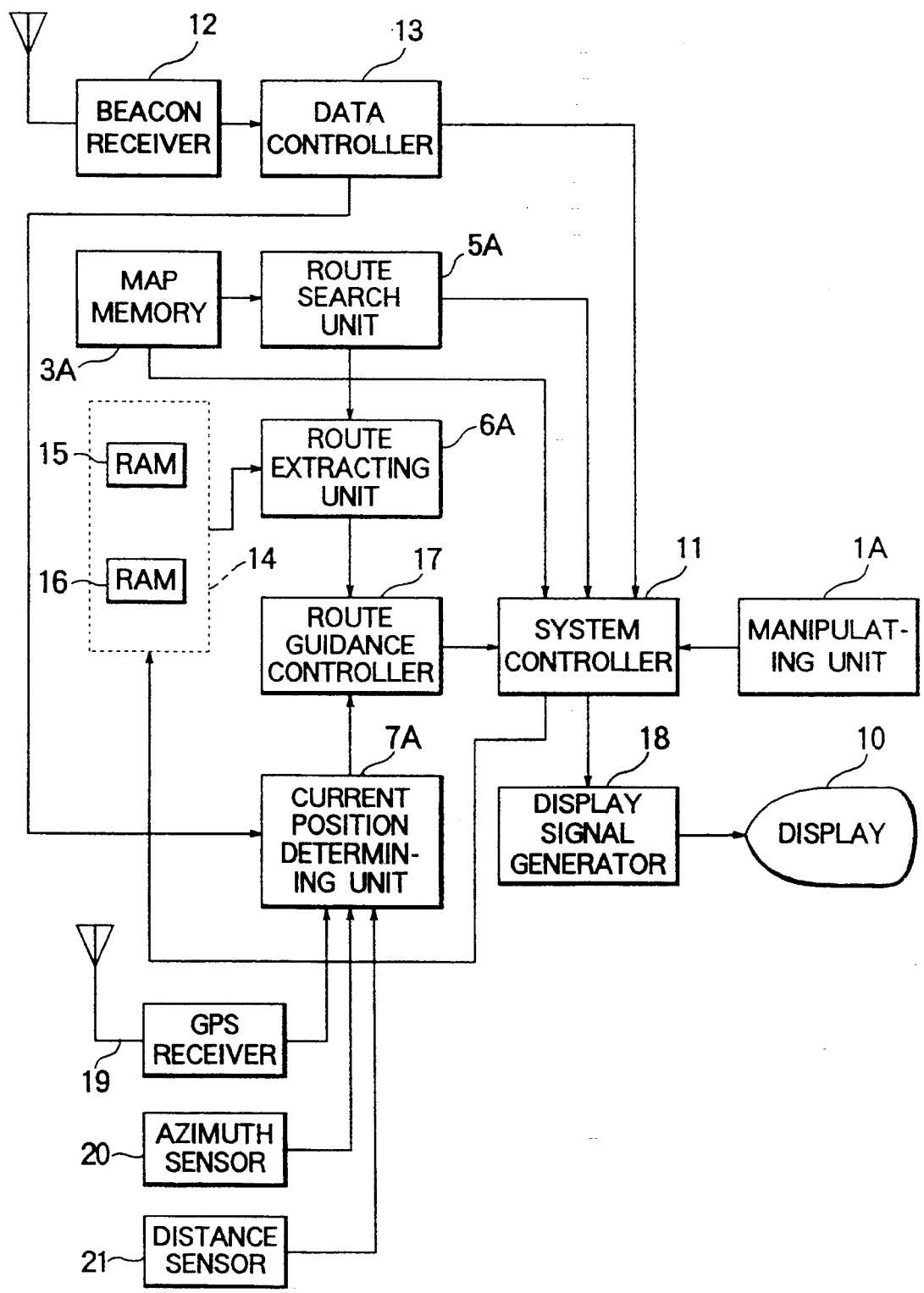
FIG. 1 is a block diagram showing the general structure of a navigation system for a motor vehicle according to the invention.

FIG. 1 is a block diagram generally showing the structure of a navigation system for a motor vehicle according to the invention. In the figure, reference symbol 1A denotes a manipulating unit for inputting information concerning a destination, roundabout or bypass roads desired by a driver, a starting time and a plurality of side destinations (i.e., places at which the motor vehicle is to drop in) on the way to the destination. The manipulating unit 1A is connected to a system controller 11 which serves to record or store the destination and the side destinations in terms of the coordinates on a road map and which is in charge of controlling operations of the whole system on the basis of the various data inputted through the manipulating unit 1A. A beacon receiver 12 is provided for receiving a beacon signal indicative of location information which is utilized for calibrating the position of the motor vehicle as well as traffic information concerning traffic situations on the roads. The output of the beacon receiver 12 is coupled to a data controller 13 which classifies the output data of the beacon receiver 12 into traffic information data and vehicle position calibrating data, both of which are then supplied to the system controller 11.

Further connected to the system controller 11 is a map memory 3A for storing information or data of a road network and road segments included in the road network as well as information concerning the required times taken for driving the motor vehicle along the road segments in dependence on the days of the week and the time zones (the information and data stored in the map memory 3A will hereinafter be referred to as the map data). A route search unit 5A is interposed between the map memory 3A and the system controller 11 for searching route sets extending from the current location of the motor vehicle to the destination (or from a given place to another given place) from the map data stored in the map memory 3A on the basis of the data loaded from the manipulating unit 1A through the system controller 11. Further provided is a RAM (Random Access Memory) unit 14 which includes a RAM 15 for storing information concerning the bypass roads designated through the manipulating unit 1A and a RAM 16 for storing information concerning the traffic congestion, which information is input from the beacon receiver 12 through the data controller 13 and the system controller 11. The RAM unit 14 is connected to a route extracting unit 6A which is also connected to the route search unit 5A for reading out from the RAM unit 14 the information concerning the bypass roads designated by the driver as well as the information concerning the traffic congestion on the basis of the data output from the route search unit 5A for a plurality of route sets which allow the motor vehicle to reach the destination from the current vehicle location. An optimum route set capable of leading the motor vehicle to the destination under an optimum condition (this optimum route set will also be referred to as the guidance route) is selected by the route extracting unit 6A.

Figure 9:
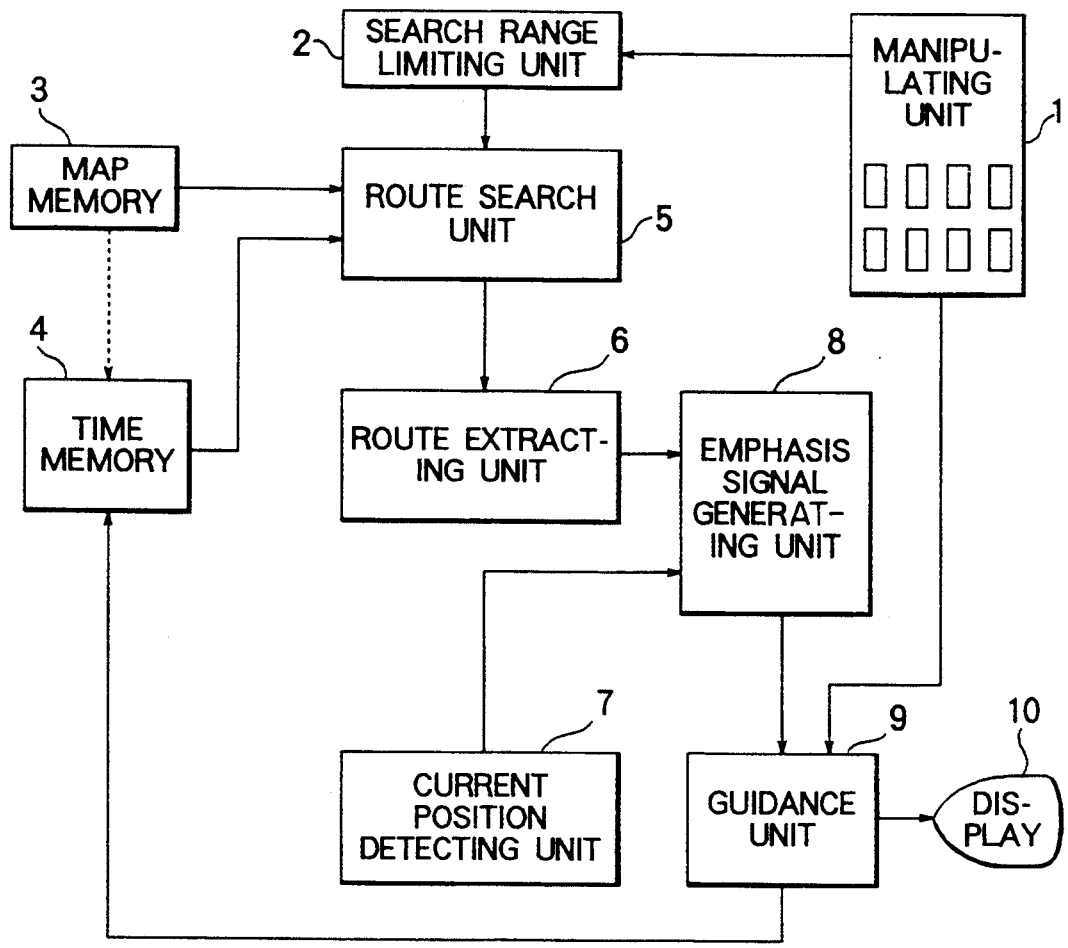
FIG. 9 is a block diagram showing the structure of a conventional navigation system installed on a motor vehicle.
Figure 10:
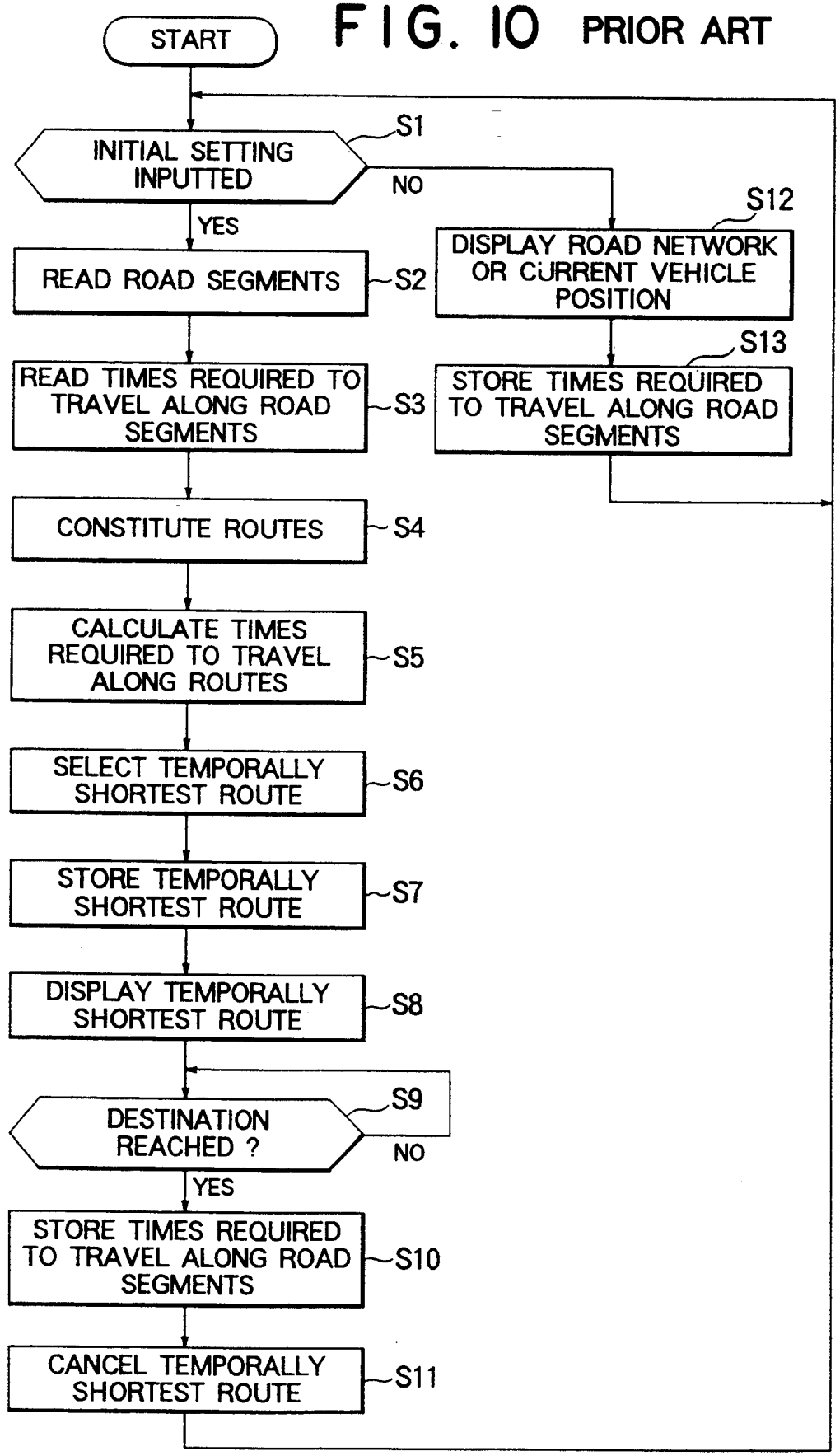
FIG. 10 is a flow chart for illustrating the operation of the navigation system shown in FIG. 9.

The navigation system according to the instant embodiment of the invention is provided with a variety of sensors such as a GPS (Global Positioning System) sensor (a sort of radio receiver) 19 for detecting the current position of the motor vehicle, an azimuth sensor 20 for detecting an azimuth direction of the motor vehicle, a distance sensor 21 for detecting a distance travelled by the motor vehicle, and other sensors (not shown). The output data of the GPS sensor 19, the azimuth sensor 20 and the distance sensor 21 are supplied to a current position determining unit 7A which arithmetically determines the current position of the motor vehicle on the basis of the data supplied from the sensors mentioned above. The output data of the current position determining unit 7A is input to a route guidance controller 17 which is also connected to the output of the route extracting unit 6A, for thereby arithmetically determining the distance from a certain point (i.e., a desired or nearest point) of the guidance route to the current position on the basis of the data output from the current position determining unit 7A and the route extracting unit 6A. Finally, reference numeral 18 denotes a display signal generator which is operatively connected to the system controller 11 for generating signals representive of the current position of the motor vehicle, the destination and the optimum route extending from the current position to the destination on a road map on the basis of the output data from the system controller 11, wherein the signals mentioned above are displayed on a display unit 10 which may be constituted by a conventional one such as described hereinbefore in conjunction with FIG. 9.

Figure 2A:
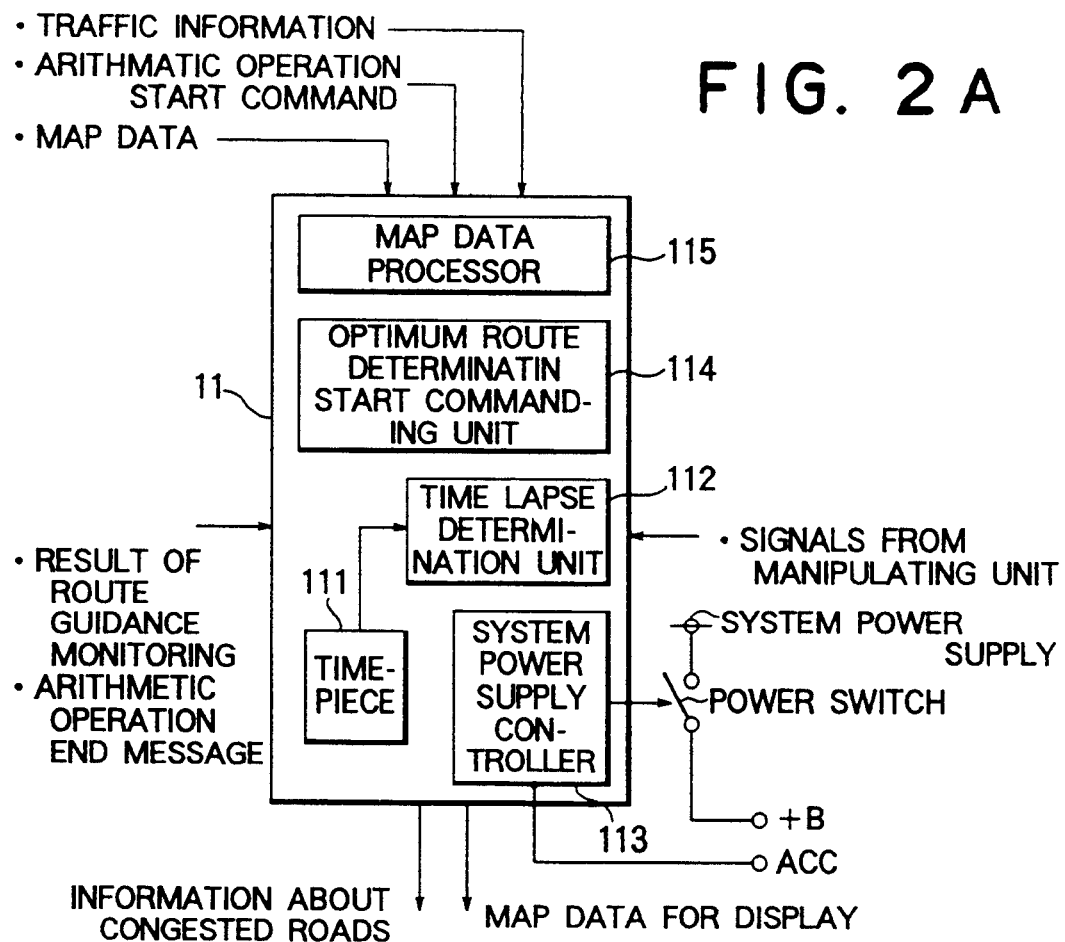
FIG. 2A is a block diagram schematically showing the structure of a system controller incorporated in the system of FIG. 1.

FIG. 2A is a block diagram showing a structure of the system controller 11 in further detail. Referring to FIG. 2A, reference numeral 11 denotes a timepiece, the time data of which is supplied to a time lapse decision unit 112. More specifically, when a system power supply (i.e., the power supply of the navigation system) is turned on, the time lapse decision unit 112 reads out the time data from the timepiece 111 for comparing the time point at which the system power supply is turned on and the time point at which the optimum route has been extracted if it was generated. The system controller 11 further includes a system power supply controller 118 for connecting the system power supply line to a battery voltage source +B of an onboard battery of the motor vehicle by turning on a power switch even when a starter switch for an ACC power supply is in the off-state, an optimum route determination commanding unit 114 which sends to the route search unit 5A (FIG. 1) a message commanding the start of arithmetic determination of another optimum route together with parameters therefor when the comparison performed by the time lapse decision unit 112 shows that a predetermined time has elapsed, and a map data processing unit 115 for processing the map data available from the map memory 3A (FIG. 1).

Figure 2B:
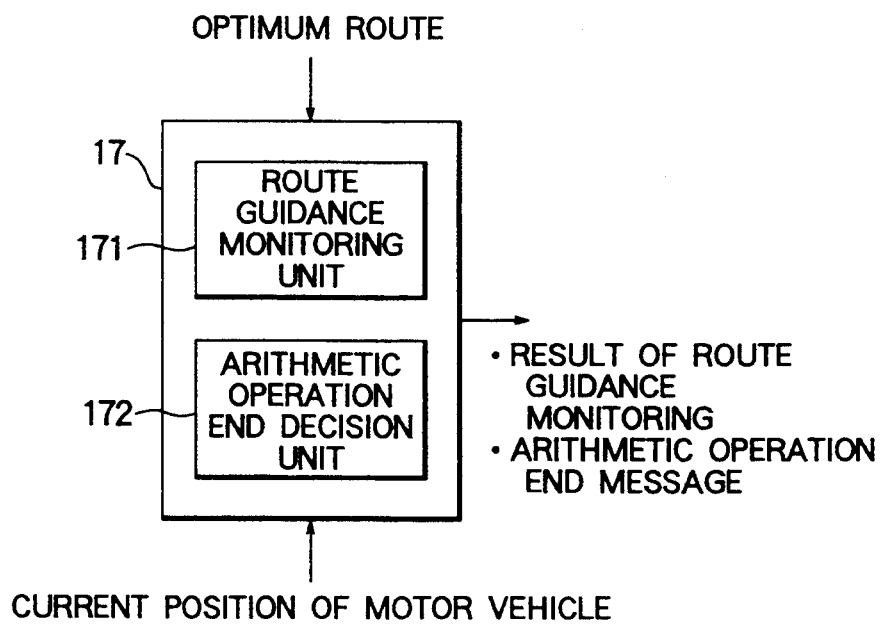
FIG. 2B is a block diagram schematically showing the structure of a route guidance controller incorporated in the system of FIG. 1.

FIG. 2B is a block diagram showing the structure of the route guidance controller 17. As can be seen from this figure, the route guidance controller 17 includes a route guidance monitoring unit 171 for arithmetically determining a distance deviation between the current position of the motor vehicle and the guidance route on the basis of the outputs from the route extracting unit 6A (FIG. 1) and the current position determining unit 7A (FIG. 1), to thereby output to the system controller 11 (FIG. 1) the result of the arithmetic operation indicative of whether or not the distance deviation exceeds a predetermined value, and an arithmetic operation end decision unit 172 for messaging to the system controller 11 that the arithmetic determination of the optimum route has been completed.

Figure 3:
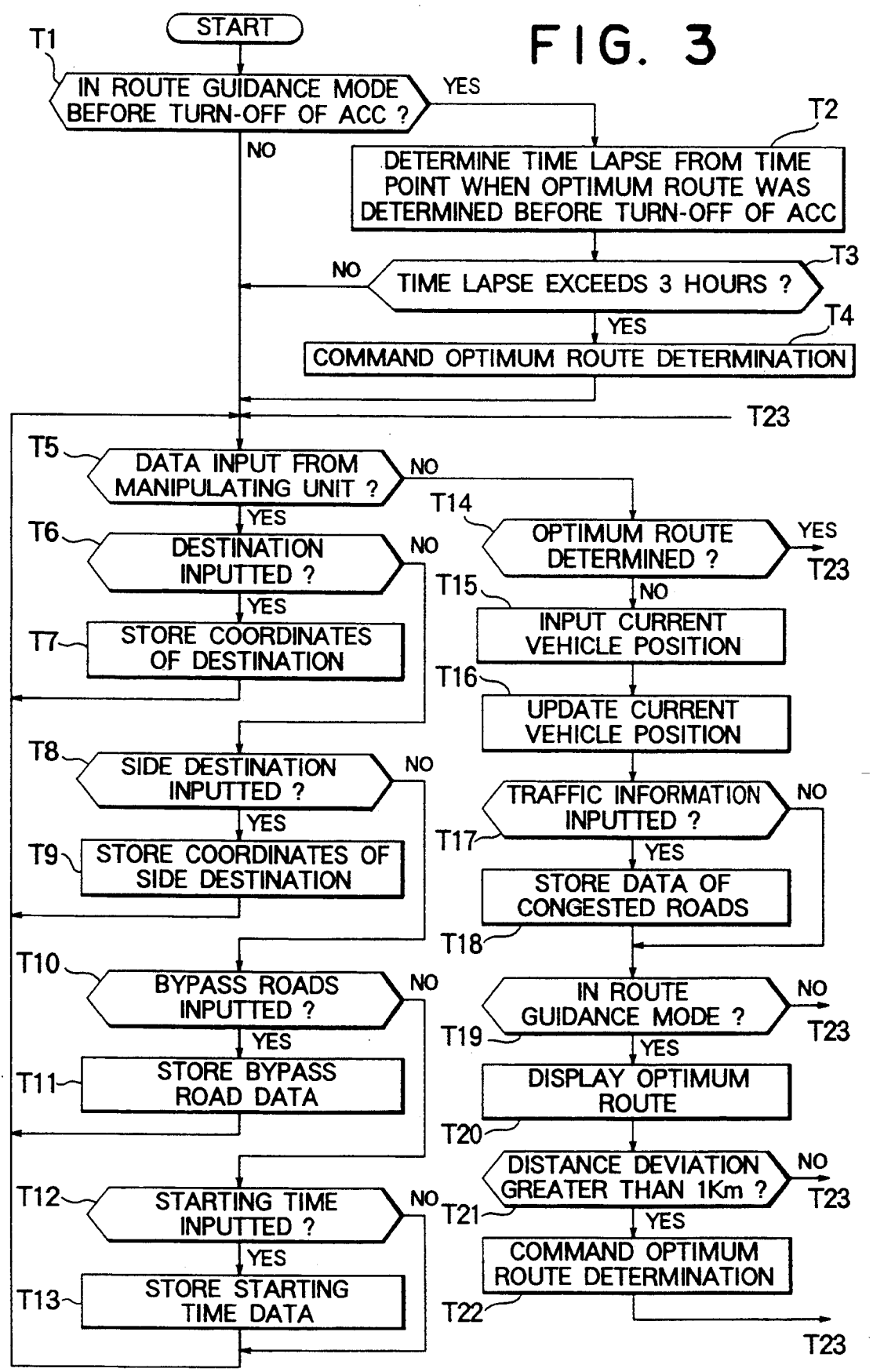
FIGS. 3 and 4 are flow charts for illustrating the operation of the system controller of FIG. 2A.
Figure 4:
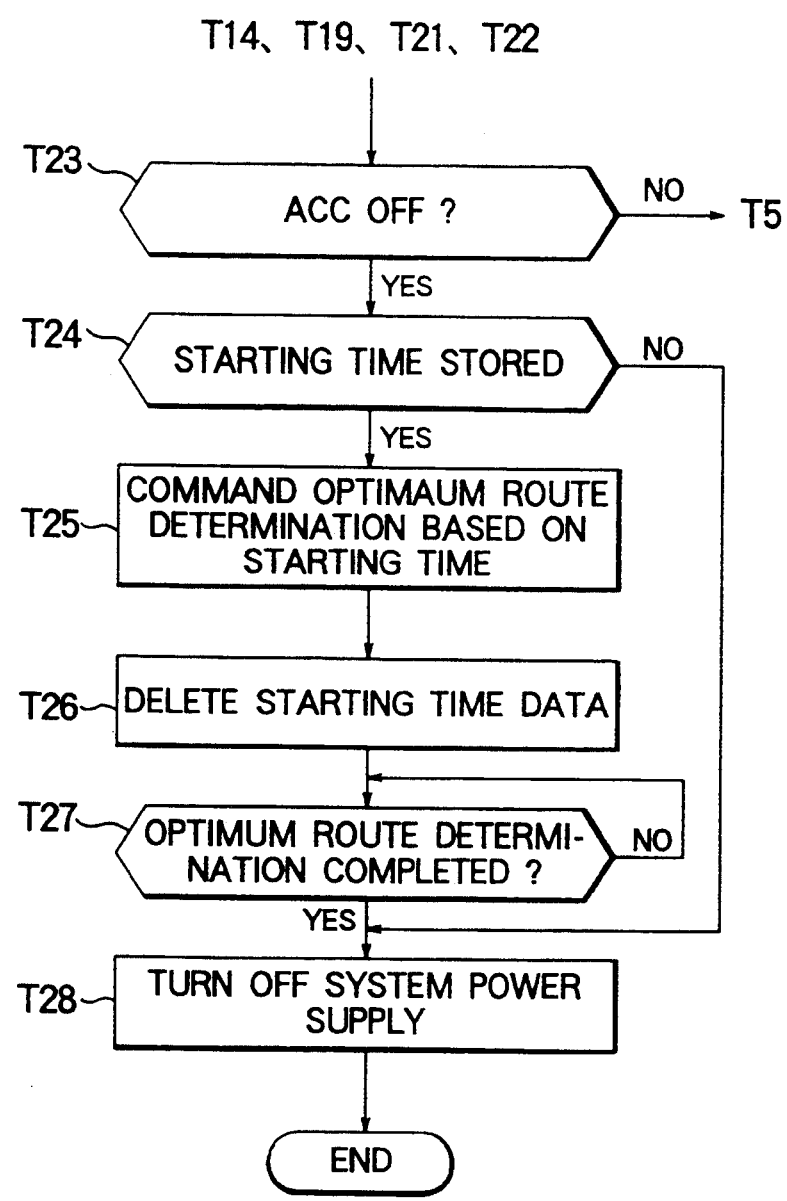

Next, operation of the system controller 11 according to the instant embodiment will be described by reference to flow charts shown in FIGS. 3 and 4.

When the ACC power supply of the motor vehicle is turned on, the system power switch is turned on by the system power supply controller 113, whereby the system power supply is connected to the voltage source +B to start the operation of the navigation system. Upon start of the operation, it is decided by the system controller 11 at a step T1 whether or not the navigation system had been in the route guidance mode before the ACC power supply was turned off. In case the system had been in the route guidance mode (i.e., when the answer in the step T1 is affirmative "YES"), the processing proceeds to a step T2. In the step T2, the time lapse decision unit 112 arithmetically determines a time lapse from the time point when the optimum route had been determined before the ACC power supply was turned off. In a step T8, the system controller 11 makes decision as to whether or not the time lapse mentioned above exceeds, for example, three hours. When the answer in this decision step T3 is affirmative (YES), the processing proceeds to a step T4 in which the optimum route determination start commanding unit 114 issues a command to the route search unit 5A for starting the arithmetic operation to determine another optimum route (guidance route) while supplying parameters concerning the necessary conditions, whereupon a step T5 is executed.

On the other hand, when it is decided in the step T1 that the system had not been in the route guidance operation mode before the AC power supply was turned off (i.e., when the answer in this decision step T1 is negative), the processing proceeds to a step T5. Besides, when the answer in the decision step T3 is negative (NO), the processing also proceeds to the step T5.

In the step T5, the system controller 11 makes decision as to whether data have been loaded from the manipulating unit 1A. If so (YES), the processing proceeds to a step T6, in which the system controller 11 decides whether or not the data input from the manipulating unit 1A is data of the destination. If so (YES), a step T7 is then executed to store the coordinates data of the destination in the RAM 16, and thereafter a return is made to the step T5.

In contrast, when it is decided in the step T6 that the data input from the manipulating unit 1A does not represent the destination (i.e., when the answer in the step T6 is "NO"), the processing proceeds to a step T8 in which the system controller 11 makes decision again as to whether or not the data input from the manipulating unit 1A are for the side destination(s) at which the motor vehicle is to drop in on the way to the intrinsic or final destination. If so (YES), the processing proceeds to a step T9 in which the coordinates of the side destination(s) are stored in the RAM 16, and then the step T5 is resumed.

On the other hand, when the decision in the step T8 results in that the data input from the manipulating unit 1A are not for the side destination, a step T10 is executed, in which the system controller 11 makes decision again as to whether or not the data input from the manipulating unit 1A are for the bypass road(s). If the answer in this step T10 is affirmative (YES), then a step T11 is executed for storing the bypass road data in the RAM 15 and then the step T5 is regained.

When it is decided in the step T10 that the input through the manipulating unit 1A is not for the bypass road (i.e., when the answer in the step T10 is "NO"), the processing proceeds to a step T12 where the system controller 11 makes decision as to whether or not the input from the manipulating unit 1A is data of the time point at which the motor vehicle is to be started. If so (YES), the processing proceeds to a step T13 in which the starting time data is stored in the RAM 16, whereupon a return is made to the step T5. When the decision in the step T5 shows that no data is loaded from the manipulating unit 1A (i.e., when the answer in this decision step T5 is negative), the processing proceeds to a step T14 in which the system controller 11 makes decision as to whether or not the route search unit 5A and the route extracting unit 6A are in the course of determining the optimum route. When the result of this decision step T14 is negative (NO), the processing proceeds to a step T15, in which the current position data of the motor vehicle is loaded to the system controller 11 from the current position determining unit 7A through the route guidance controller 17 to thereby update the current position of the motor vehicle, the result of which is then displayed in a step T16. Subsequently, in a step 17, the system controller 11 decides whether or not the traffic information is available from the data controller 13. If the traffic information is available and input, the processing proceeds to a step T18 in which data of the congested road(s) are stored in the RAM 16, then followed by execution of a step T19. In contrast, if it is decided in the step 17 that no traffic information is input, the processing jumps to a step T19 straightforwardly.

Now, in the step T19, the system controller 11 makes decision as to whether or not the navigation system is in the route guidance operation mode. If so (YES), a step T20 is then executed to supply to the display signal generating unit 18 a signal for displaying the optimum route in a step T20. Thus, the optimum route is displayed on the display unit 10 through the display signal generating unit 18. In succession., in a step T21, it is decided by the system controller 11 whether or not the distance deviation of the current vehicle position from the guidance or optimum route as determined by the route guidance control unit 17 exceeds a predetermined value such as , for example, 1 km. If so (YES), a step T22 is then executed to command the route search unit 5A to start an arithmetic operation for determining the optimum route on the basis of the current vehicle position.

In contrast, when it is decided in the step T14 on the basis of the output from the route guidance controller that the optimum route is being arithmetically determined (i.e., when the answer in the step T14 is "YES"), the processing proceeds to a step T23. Similarly, unless it is decided in the step T19 that the system is in the guidance operation mode, the processing proceeds to the step T23. Additionally, if the distance deviation of the current vehicle position from the guidance route is decided to be smaller than 1 km, execution of the step T23 is performed.

In the step T23, it is decided by the system power supply controller 113 whether or not the ACC power supply is turned off. If so (YES), the processing proceeds to a step T24, in which the system controller 11 makes decision as to whether or not the starting time (i.e., the time point at which the motor vehicle is to be started) loaded through the manipulating unit 1A has already been stored. If so (YES), the processing proceeds to a step T25 in which the optimum route determination start commanding unit 114 commands the route search unit 5A and the route extracting unit 6A to start the optimum route determining operation on the basis of the starting time data mentioned above, which is then followed by a step T26 where the starting time data is erased by the system controller 11. In succession, in a step T27, it is decided by the system power supply controller 11 on the basis of the output from the route guidance controller 17 whether or not arithmetic determination of the optimum route has been completed. If so (YES), the processing proceeds to a step T28, while otherwise the processing described above is repeated until the operation for arithmetically determining the optimum route has been completed. Upon completion of the arithmetic operation for determining the optimum route, the power switch is opened by the system power supply controller to interrupt the power supply of the source voltage +B to the navigation system in the step T28, whereupon the processing comes to an end.

At this juncture, it should also be mentioned that when decision is made in the step T23 that the ACC power supply is not turned off, the step T5 is regained. Further, decision in the step T24 that the starting time data has not been stored is followed by execution of the step T28.

Figure 7A:
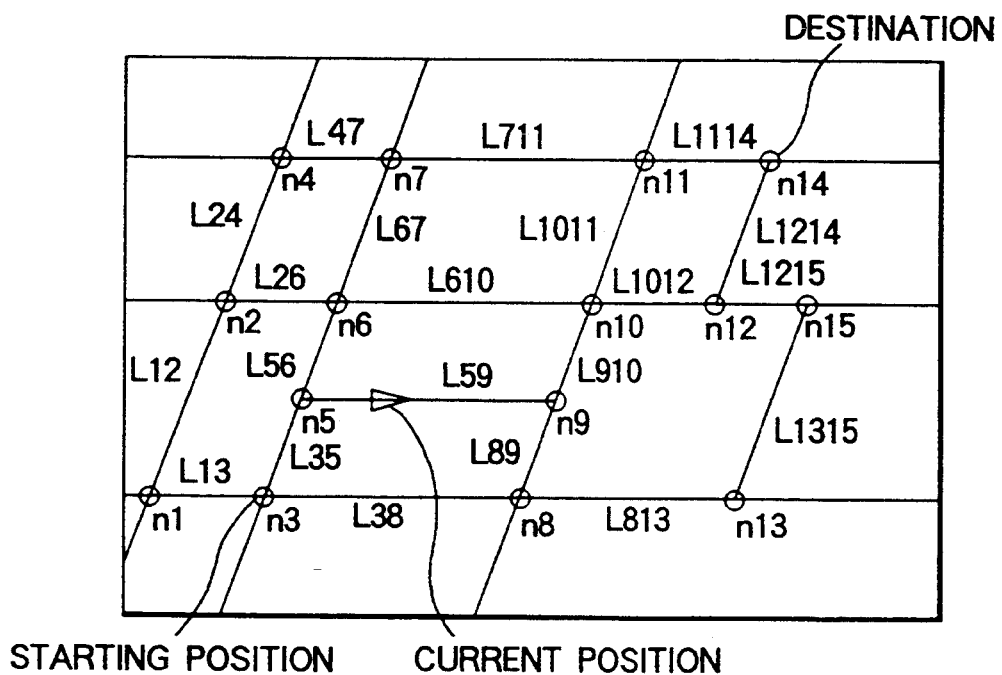
FIGS. 7A and 7B are diagrams for illustrating an operation performed by the navigation system of FIG. 1 when a motor vehicle is deviated from a previously set guidance route.
Figure 7B:
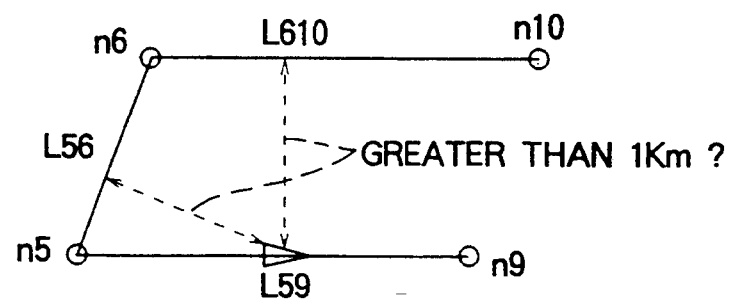

An example of the optimum route display generated on the display unit 10 at the step T20 mentioned previously is illustrated in FIG. 7A. In this figure, reference symbols n1-n15 represent cross-points (also referred to as the nodes) and L12, L13, L24, L26, L35, L38, L47, L56, L59, L67, L89, L610, L711, L813, L910, L1011, L1012, L1114, L1214, L1215 and L1315 denote road segments (also referred to as the links), respectively. By way of example, the node n3 represents the position of the motor vehicle at the time point when the optimum route was arithmetically determined, the node n14 represents the destination and a sequence of the links L35, L56, L610, L1011 and L1114 represents the optimum route. When the current position of the motor vehicle lies on the link L59, the distance deviation from the optimum route is arithmetically determined through the procedure illustrated in FIG. 7B to decide whether or not the distance deviation exceeds 1 km.

Figure 5:
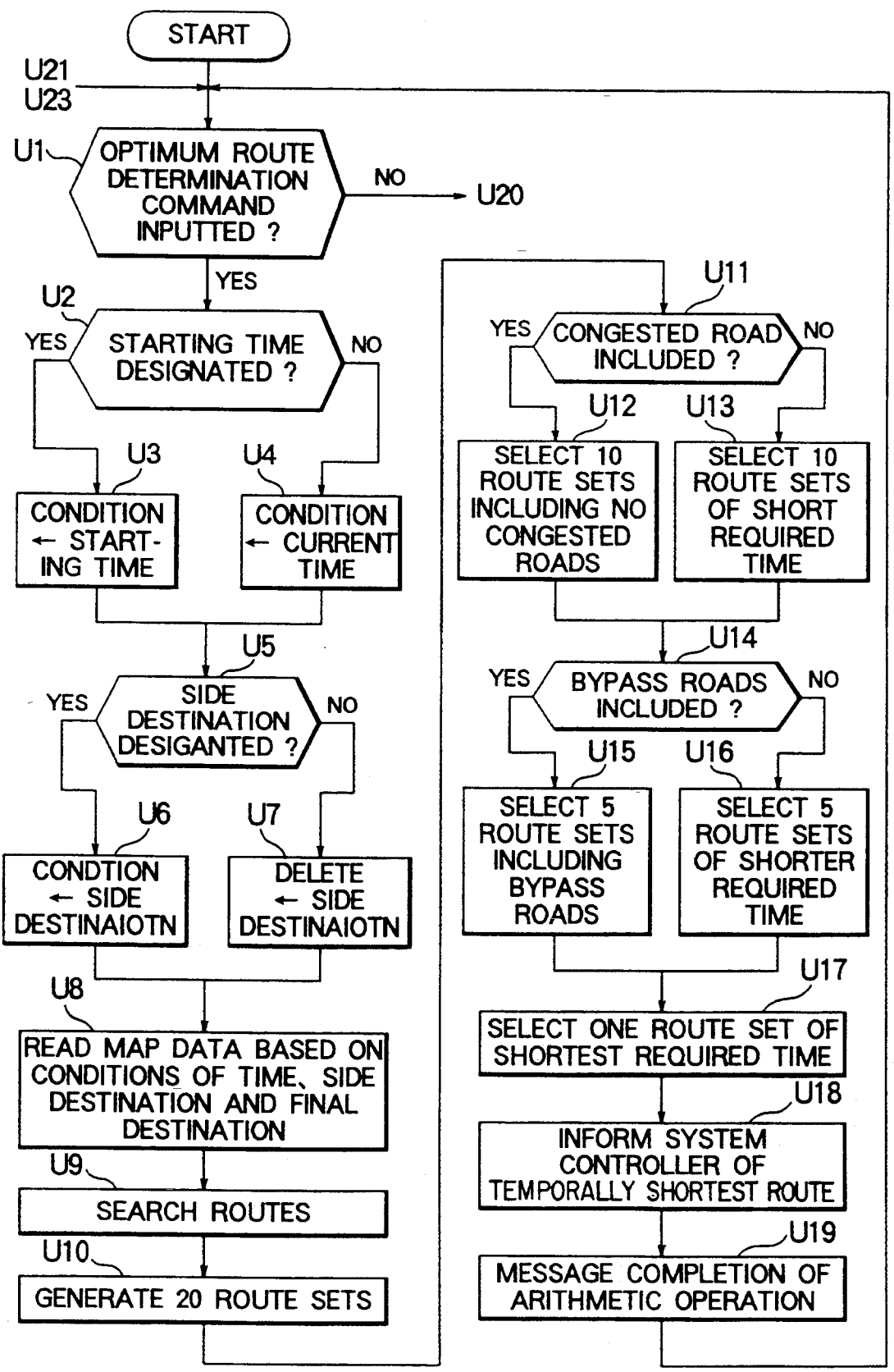
FIGS. 5 and 6 are flow charts for illustrating the operations of a route search unit, a route extracting unit and a route guidance controller incorporated in the system of FIG. 1.

Next, description will be made of operations of the route search unit 5A, the route extracting unit 6A and the route guidance controller 17 by reference to flow charts shown in FIGS. 5 and 6. In a step U1, the route search unit 5A makes decision as to whether or not the optimum route determination command is input from the system controller 11. If so (YES), the processing proceeds to a step U2 where the route search unit 5A decides whether or not the starting time is designated from the manipulating unit 1A through the system controller 11. If it is decided in the step U2 that the starting time designation is input, the processing proceeds to a step U3 where the starting time is set in accordance with the conditions as designated. On the contrary, if it is decided by the route search unit 5A that no starting time is designated, the processing proceeds to a step U4 where the current time is set in accordance with the data supplied from the timepiece 111.

In the step U5, the route search unit 5A makes decision as to whether or not there are the side destination(s) designated by the manipulating unit 1A through the system controller 11. If so (YES), the processing proceeds to the step U6, where the side destination(s) is determined on the basis of the information or parameters as input, whereupon the processing proceeds to a step U8. On the other hand, if it is decided by the route searching unit 5A in the step U5 that no designation of the side destination is loaded, a step U7 is then executed to cancel the conditions concerning the side destination. Thereafter, the processing proceeds to a step U8.

In succession, in the step U8, the route searching unit 5A reads out map data from the map memory 3A on the basis of the given conditions concerning the time, the side destination and the intrinsic destination. Subsequently, in a step U9, the route search unit 5A searches the route sets which allow the motor vehicle to reach the destination on the basis of the current vehicle position data available from the current position determining unit 7A through the route guidance controller 17 and the system controller 11 as well as on the basis of the map data read out from the map memory 3A. As a result of this, the route search unit 5A generates, for example, twenty route sees in a step U10.

Next, in a step U11, the route extracting unit 6A reads out the information of congested roads from the RAM 16 and makes decision as to whether or not any congested road is included in the route sets generated previously. If so (YES), the processing proceeds to a step U12 where the route extracting unit 6A selects, for example, ten route sets including the less congested roads. The processing then proceeds to a step U14. On the other hand, if it is decided in the step U11 that the generated route sets include no congested road (i.e., the answer in this step is "NO"), the processing proceeds to a step U13 where the ten route sets which require less time to reach the destination are selected, which is then followed by execution of the step U14.

In the step U14, the route extracting unit 6A reads out the information of the desired bypass roads from the RAM 15 and makes decision as to whether or not the bypass roads are included in the ten route sets selected as mentioned above. If so (YES), then a step U15 is executed to select, for example, five route sets including the bypass roads, which is then followed by execution of a step U17. On the other hand, if it is decided in the step U14 that no bypass road is included in the selected route sets, the processing proceeds to a step U16 where five route sets which involve less time taken for reaching the destination are selected, whereupon the processing proceeds to a step U17.

In this step U17, the route extracting unit 6A finally selects one route set which requires the least or shortest time for the motor vehicle to reach the destination. Subsequently, in a step U18, the one route set finally selected is messaged to the system controller 11 through the route guidance controller 17 as the optimum route. In a step U19, the arithmetic operation end decision unit 172 informs the system controller 11 of completion of the optimum route determining operation of the route guidance controller 17.

Figure 6:
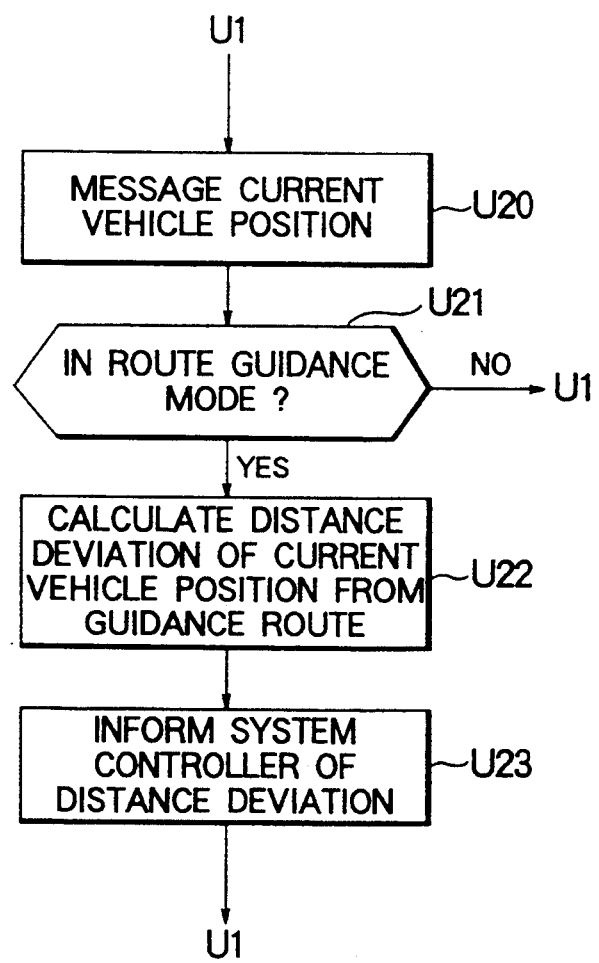

In case the route search unit 5A decides in the step U1 that no command for starting the optimum route determining operation is issued from the manipulating unit 1A through the system controller 11 (i.e., the answer in the step U1 is "NO"), the processing branches to a step U20 shown in FIG. 6, where the route guidance controller 17 fetches the current vehicle position from the current position determining unit 7A and informs the system controller 11 of the current vehicle position thus fetched. In succession, in a step U21, the route guidance controller 17 makes decision as to whether or not the navigation system is in the route guidance mode. If so, the processing proceeds to a step U22. In the step U22, the route guidance controller 17 arithmetically determines the distance deviation of the current vehicle position from the guidance route through cooperation with the route guidance monitoring unit 171. Next, in a step U23, the route guidance controller 17 messages the distance deviation to the system controller 11, whereupon a return is made to a step U1. In this regard, it should also be mentioned that if the route guidance controller 17 makes decision in the step U21 that the navigation system is not in the route guidance operation mode, the step U1 is also regained.

Figure 8:
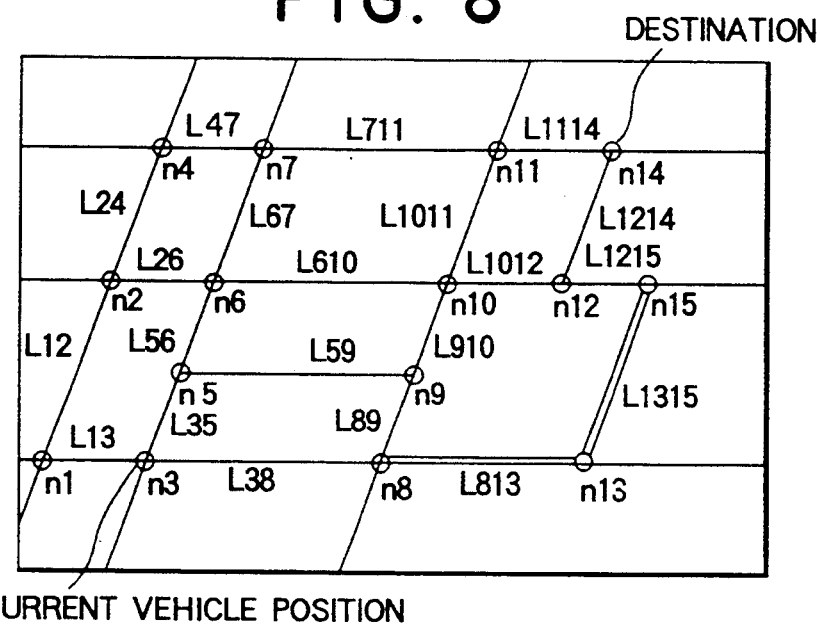
FIG. 8 is a diagram for illustrating a manner in which an optimum route is extracted by the navigation system of FIG. 1.

FIG. 8 illustrates the route sets generated by the route search unit 5A, where reference symbols are of the same contents as those used in FIG. 7. By way of example, the starting position of the motor vehicle is represented by a node n3, the current vehicle position is indicated by an arrow on the link L59, the destination is represented by a node n14, the congested roads are represented by links L35, L56, L67, L47, L711, L1114, L89, L910 and L1011, respectively, and the bypass roads set by the driver are represented by links L813 and L1315, respectively. The selected route set is represented by an array or series of the links L38, L813, L1315, L1215 and L1214, by way of example.

In the foregoing, a preferred embodiment of the present invention has be described. Many features and advantages of the invention will be apparent from the detailed description of the specification and thus it is intended by the appended claims to cover all such features and advantages of the system which fall within the true spirit and scope of the invention. Further, since numerous modifications and changes will readily occur to those skilled in the art, it is not desired to limit the invention to the embodiment illustrated and described. For example, although the processing steps U13, U16 and U17 shown in FIG. 5, which are executed by the route search unit 6A, are so arranged as to select the route sets requiring less time for the motor vehicle to reach the destination, these processing steps may be so modified as to select those route sets which have shorter distances to be travelled by the motor vehicle for reaching the destination. Further, in the case of the illustrated embodiment, the optimum route is to be determined again through the processing steps T21 and T22 executed by the system controller 11 (see FIG. 3) if it is decided that the distance deviation exceeds 1 km. However, it can be modified such that the optimum route is corrected only partially to generate an updated optimum route if the distance deviation is in a range of 1 km to 5 km, while an utterly new optimum route is generated again if the distance deviation exceeds 5 km. In addition, if it is decided in the step T21 shown in FIG. 3 that the distance deviation exceeds 1 km, the optimum route determination start commanding unit 114 may generate the information for alerting the driver to this fact visually through the display signal generating unit 18 or audibly by activating a buzzer (not shown). Accordingly, it should be understood that all suitable modifications and equivalents may be resorted to without departing from the spirit and scope of the invention.

What is claimed is:

1. A navigation system for a motor vehicle, comprising:

manipulating means for designating at least a destination;

first storage means for storing information concerning a road network and road segments which constitute said road network;

current position detecting means for detecting a current position of said motor vehicle;

route search means for searching a plurality of routes which allows said motor vehicle to reach said destination from the current position thereof on the basis of said information available from said first storage means;

route extracting means for extracting an optimum route leading to said destination from said plurality of routes;

time lapse decision means for deciding whether or not a predetermined time period has elapsed after said optimum route was extracted, said predetermined time period starting at a point of time a system power supply was turned off; and optimum route determination start commanding means for commanding said route search means and said route extracting means to start arithmetic determination of another optimum route, when it is decided by the time lapse decision means that said predetermined time period has elapsed.

2. The navigation system as claimed in claim 1 wherein the end of said predetermined time period is a point of time the system power supply is turned on.

3. A navigation system for a motor vehicle, comprising:

manipulating means for setting at least a destination and a starting time of said motor vehicle from a current position thereof;

first storage means for storing information concerning a road network and road segments which constitute said road network;

current position detecting means for detecting the current position of said motor vehicle;

route search means for searching a plurality of routes which allows said motor vehicle to reach said destination from the current position based on said information available from said first storage means;

route extracting means for extracting an optimum route from said plurality of routes;

optimum route determination start commanding means for commanding said route search means and said route extracting means to start arithmetic determination of said optimal route at the time of starting said motor vehicle and;

system power control means for maintaining a system power supply in a conducting state to, continue the arithmetic determination, even after a battery power supply of said motor vehicle is turned off and for turning said system power supply off after said optimal route has been extracted by said route extracting means.

* * * * *